United States Patent [19]
Triolo et al.
[11] Patent Number: 4,909,475
[45] Date of Patent: Mar. 20, 1990

[54] ELECTROMAGNETIC AIR CONTROL VALVE FOR AN INTERNAL COMBUSTION ENGINE FUEL SUPPLY DEVICE

[75] Inventors: Innocenzo Triolo, Casalecchio Di Reno; Gino Baldi, Bologna, both of Italy
[73] Assignee: Weber S.r.l., Turin, Italy

[21] Appl. No.: 393,016
[22] Filed: Aug. 10, 1989

Related U.S. Application Data

[63] Continuation of Ser. No. 290,690, Dec. 27, 1988, abandoned.

[30] Foreign Application Priority Data

Dec. 24, 1987 [IT] Italy .............................. 68126 A/87

[51] Int. Cl.[4] .............................................. F16K 31/06
[52] U.S. Cl. ......................... 251/129.18; 251/129.15; 137/625.37
[58] Field of Search ...................... 251/129.19, 129.15, 251/129.1, 129.18; 137/625.37

[56] References Cited

U.S. PATENT DOCUMENTS 3,588,039 6/1971 Chelminski .................... 251/129.15
4,524,947 6/1985 Barnes et al. .
4,714,089 12/1987 Ueda et al. .

FOREIGN PATENT DOCUMENTS 0055518 of 0000 European Pat. Off. .
0128124 of 0000 European Pat. Off. .
0131694 of 0000 European Pat. Off. .

OTHER PUBLICATIONS

European Search Report-EP 88121695.6.

*Primary Examiner*—Arnold Rosenthal
*Attorney, Agent, or Firm*—Albert L. Jeffers; John F. Hoffman

[57] ABSTRACT

A valve comprising a body having a cylindrical sliding seat and an opening for the passage of air; a plunger sliding axially inside the aforementioned seat, for regulating the aforementioned air supply opening; and an electromagnet, the core of which presents a rod fitting through an axial hole on the plunger. According to the present invention, the plunger is connected elastically to the rod by means of two springs, each designed to exert elastic force on the plunger in the opposite direction to that of the other spring; regulating means being provided for enabling predetermined preloading of both springs.

15 Claims, 2 Drawing Sheets

ELECTROMAGNETIC AIR CONTROL VALVE FOR AN INTERNAL COMBUSTION ENGINE FUEL SUPPLY DEVICE

This is a continuation of application Ser. No. 290,690, filed Dec. 27, 1988 now abandoned.

BACKGROUND OF THE INVENTION

The present invention relates to an electromagnetic air control valve for an internal combustion engine fuel supply device, in particular, for controlling air supply along a duct connecting two zones, respectively up- and downstream from the throttle valve.

Valves of the aforementioned type substantially comprise a body having a cylindrical sliding seat, and an opening enabling the passage of air and coming out inside said seat; a plunger sliding axially inside said seat, for regulating said air supply opening; and an electromagnet having a core designed to control displacement of the plunger when the electromagnet is energized.

Said core presents a rod, to the end of which the plunger is fitted by means of a threaded nut screwed on to the threaded end of the rod and resting on an annular collar on the same. Between the rod and a shoulder on the core, a helical spring is inserted coaxial with the rod.

Said plunger substantially comprises an outer wall of nonmagnetic material, designed to mate with the surface of said sliding seat; and an inner bush of magnetic material, connected to said wall by means of adhesive.

Valves of the aforementioned type present a number of drawbacks.

First and foremost, no strictly accurate relationship can be determined between displacement of the plunger, and consequently the air supply opening through the valve, and the amount of current supplied to the electromagnet; which relationship depends on the rigidity of the spring between the core and plunger, and on preloading of the spring at the valve assembly stage. As the springs used on different valves, however, cover a fairly wide rigidity range, and preloading of the spring at the assembly stage cannot be regulated by calibrating the valve, actual performance of the air supply opening through the valve as a function of current supply to the electromagnet may differ widely in relation to theoretical performance.

Moreover, axial displacement of the plunger inside the cylindrical sliding seat may be accompanied by friction of such an extent as to further affect the relationship between the air supply opening and current supply to the electromagnet. For part of its stroke, in fact, the plunger comes partially out of the seat, for ensuring the electromagnetic force exerted by the core on the plunger is maintained constant throughout the entire stroke. As such, the guiding action performed by the seat on the lateral surface of the plunger is not constant throughout the entire stroke of the plunger, and may even be totally insufficient when part of the plunger is actually outside the seat.

Moreover, impurities in the air fed through the valve are invariably deposited between the outer surface of the plunger and the sliding seat, thus further increasing friction between the two parts, which may even result in seizing of the plunger itself.

Finally, fatigue on the plunger may result in the bush coming away from the wall of the same.

SUMMARY OF THE INVENTION

The aim of the present invention is to provide an electromagnetic valve of the aforementioned type, designed to overcome the above drawbacks typically associated with known valves, i.e. which provides for strictly determining a given relationship between the air supply opening on the valve and current supply to the electromagnet; smooth operation of the plunger; and highly reliable operation of the valve as a whole.

With this aim in view, according to the present invention, there is provided an electromagnetic air control valve for an internal combustion engine fuel supply device, said valve comprising a body having a cylindrical seat and an opening enabling the passage of air and coming out inside said seat; a plunger sliding axially inside said seat, for regulating said air supply opening; and an electromagnet having a core designed to control displacement of said plunger when said electromagnet is energized; said core having a rod fitting through an axial hole on said plunger; characterized by the fact that said plunger is connected elastically to said rod by means of two springs, each designed to exert elastic force on said plunger in the opposite direction to that of the other spring; regulating means being provided for enabling predetermined preloading of both said springs.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
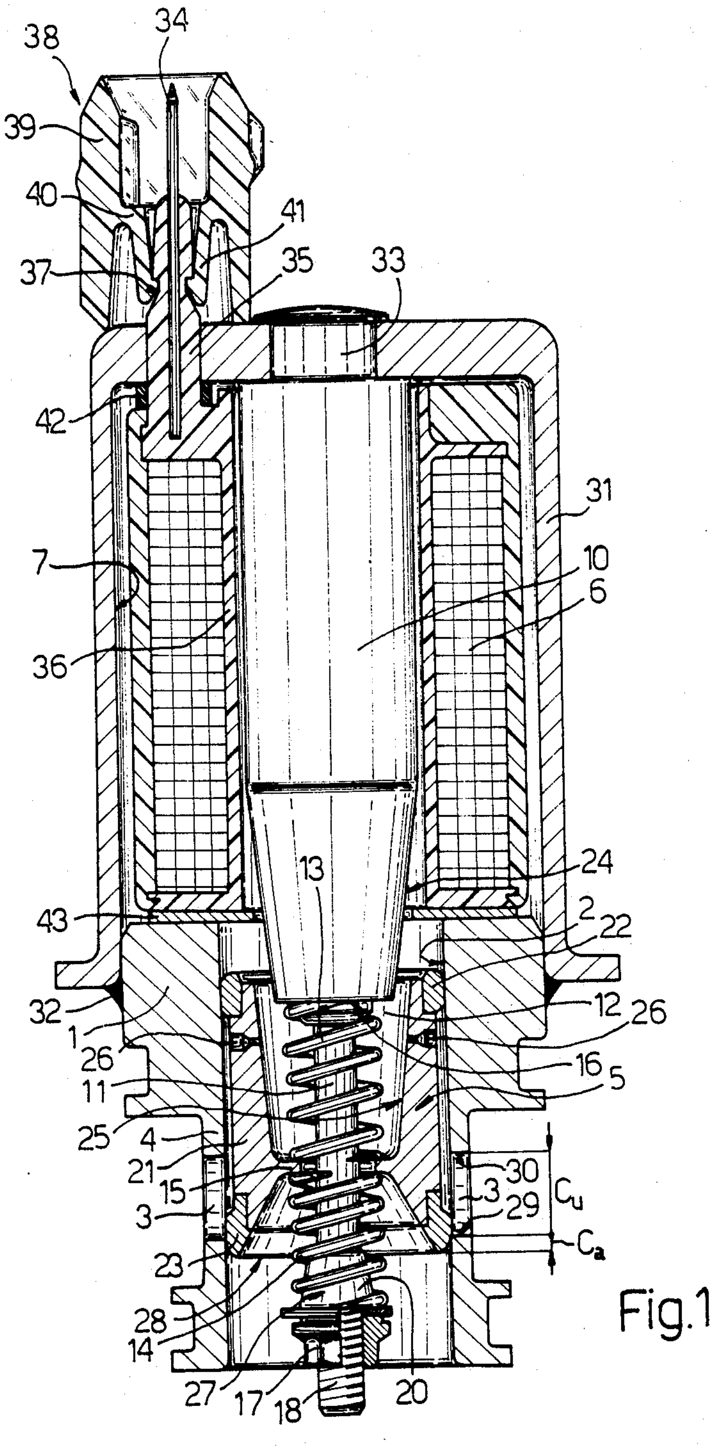
FIG. 1 shows an axial section of the valve according to the present invention.

The valve according to the present invention is suitable for fitment to an internal combustion engine fuel supply device, for controlling air supply through a duct on said device, in particular, the duct connecting two zones respectively up- and downstream from the throttle valve.

The valve according to the present invention substantially comprises a body 1 having a cylindrical sliding seat 2 and an opening 3 enabling the passage of air and coming out inside said seat. As shown clearly in FIG. 1, said opening 3 is formed inside a cylindrical wall 4 of body 1. Said valve also comprises a plunger 5 sliding axially inside seat 2, for regulating air supply opening 3. An annular electromagnet 6 inside a cavity 7 of body 1 presents a core 10 designed to control displacement of plunger 5 when the electromagnet is energized, and having a rod 11 fitting through an axial hole 12 on plunger 5.

Plunger 5 is connected elastically to rod 11 by means of two helical springs 13 and 14, each designed to exert elastic force on plunger 5 in the opposite direction to that of the other spring. For this purpose, there is formed, inside axial hole 12 on plunger 5, an annular projection 15 projecting radially towards the hole axis; spring 13 is inserted between a shoulder 16 on core 10 and annular projection 15; and spring 14 is inserted between said projection 15 and a threaded ring nut 17 screwed on to the respective threaded end portion 18 of rod 11. As shown clearly in FIG. 1, a taper bush 20 is conveniently inserted between the bottom end of spring 14 and ring nut 17, for centering spring 14 in relation to rod 11.

Plunger 5 comprises a tubular center portion 21 of magnetic material, and a pair of top and bottom end rings, 22 and 23, of nonmagnetic material, connected to center portion 21 in any convenient manner, and preferably force-fitted. The outer surface of rings 22 and 23 is designed to slide over the surface of seat 2, whereas the lateral surface of the center portion is sized in such a manner as to prevent contact with seat 2. The lateral surfaces of the center portion and rings 22 and 23 are conveniently coated with a thin film of plastic material, preferably teflon.

The portion of core 10 facing plunger 5 is defined by a conical outer surface 24, and axial hole 12 on plunger 5 at least partially by a conical surface 25; the angles of said conical surfaces differing for the reasons described in detail hereinafter.

The annular portion of center portion 21 of plunger 5, close to ring 22, presents radial holes 26 enabling axial hole 12 on plunger 5 to communicate with sliding seat 2.

The portion of axial hole 12 below annular projection 15 is defined by a conical surface 27.

Electromagnet 6 is conveniently housed inside a bell 31 of ferrous material, welded to body 1 by means of a laser weld 32. Core 10 presents an end pin 33 inserted inside a hole on bell 31 and secured to the same by permanently deforming the end of the pin itself.

Electromagnet 6 presents a pair of blades 34 connected electrically to the wire of electromagnet 6, and each partially embedded inside a respective bar 35 so as to leave the top end free. Said bars 35 are formed from synthetic material and in one piece with spool 36 of electromagnet 6. Each bar 35 conveniently presents a rectangular section, projects upwards through a respective opening in the end wall of bell 31, and presents, on two opposed lateral surfaces, a pair of small cavities 37. Bars 35 are connected to a bush 38 of plastic material, substantially presenting a lateral wall 39 and an end wall 40 with openings through which to fit bars 35. From end wall 40, there project downwards tabs 41, each having an end tooth designed to click elastically inside respective cavity 37 when bush 38 is fitted on to the valve, thus forming an electrical connecting element connectable to a further element (not shown) for supplying current to electromagnet 6.

A sealing element 42 is assembled, precompressed, betweem the top surface of electromagnet 6 and the bottom surface of the end wall on bell 31. A stop ring 43 is inserted between electromagnet 6 and body 1 for arresting upward movement of plunger 5.

The valve according to the present invention operates as follows.

When plunger 5 is fitted on to the valve, ring nut 17 is torqued so as to preload each of springs 13 and 14 as required, and so exert on annular projection 15 of plunger 5 an axial force in the opposite direction to that of the other spring. For any given preload on springs 13 and 14, therefore, plunger 5 assumes a balanced position corresponding to a specific axial position of bottom edge 28 in relation to top edge 29 of opening 3, and defined by distance Ca in FIG. 1.

Figure 4:
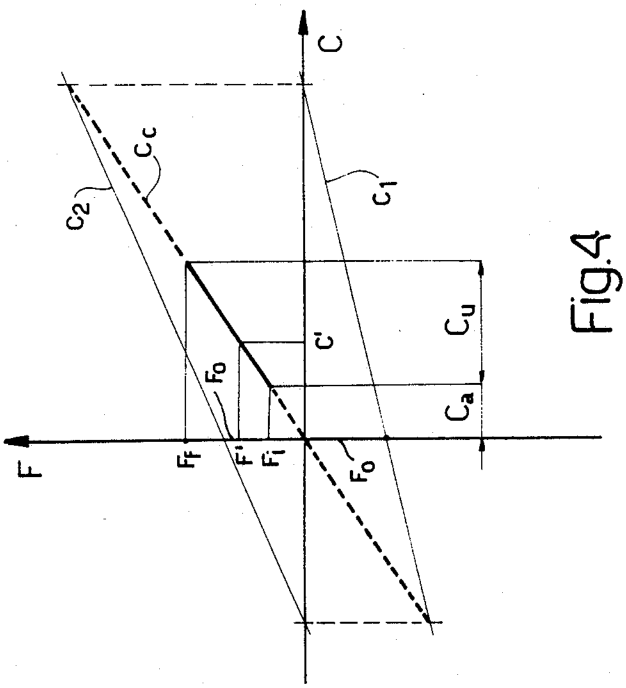
FIG. 4 shows the elastic characteristic of the spring system to which the valve plunger is connected.

In any rest configuration, with a given preload on springs 13 and 14, the elastic force exerted on plunger 5 as a function of its stroke is as shown in the FIG. 4 diagram, in which C1 and C2 indicate the elastic characteristics of the springs, and FO the opposite forces exerted, in said rest configuration, on annular projection 15 by virtue of the preload on the springs. The spring assembly elastically supporting plunger 5 therefore presents characteristic CC (dotted line) equal to the sum of characteristics C1 and C2: starting from said rest configuration, the elastic force exerted on plunger 5 by the spring assembly increases steadily alongside an increase in stroke C. F′ in the diagram indicates the elastic force corresponding to a given stroke C′.

Figure 2:
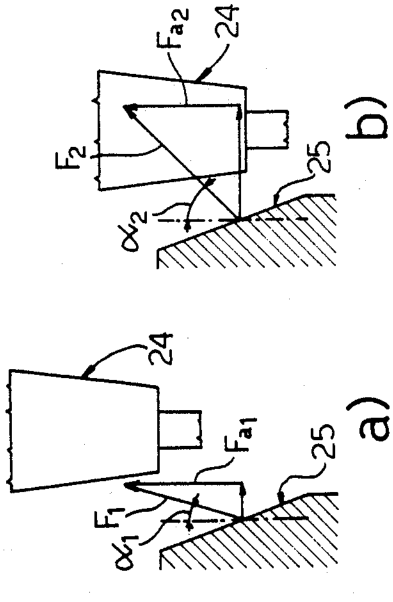
FIG. 2 shows a schematic section of parts of the core and plunger on the valve according to the present invention, in two operating positions.

When current is supplied to electromagnet 6, core 10 exerts sufficient electromagnetic force on plunger 5 to attract it in opposition to the elastic reaction of springs 13 and 14. By virture of the bottom end of core 10 and axial hole 12 on plunger 5 being defined by conical surfaces 24 and 25, the axial component of the electromagnetic force exerted by core 10 on plunger 5 has been found to be noticeably constant throughout the entire stroke of plunger 5. FIG. 2 shows two generic plunger configurations. In FIG. 2(*a*), the total electromagnetic force F1 attracting plunger 5 is fairly low, due to the distance separating plunger 5 and core 10; and angle $\alpha 1$ formed by force F1 and the valve axis is small. Fa1 in FIG. 2(*a*) indicates the axial component of the electromagnetic force.

In FIG. 2(*b*), in which plunger 5 is closer to core 10, total electromagnetic force F2 is much higher than F1, due to the small distance separating plunger 5 and core 10, whereas angle $\alpha 2$ formed by force F2 and the valve axis is fairly large. The axial component Fa2 of the electromagnetic force is, therefore, noticeably equal to Fa1 in FIG. 2(*a*).

Figure 3:
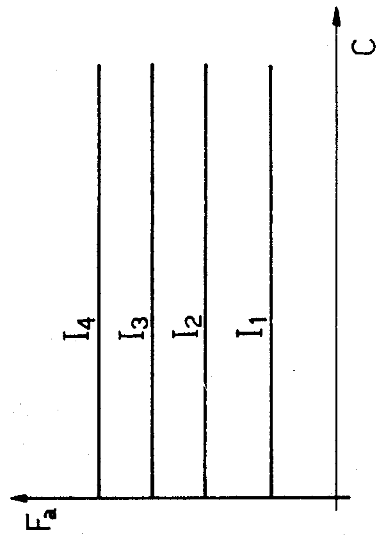
FIG. 3 shows a graph of the axial component of the electromagnetic force exerted by the core on the plunger as a function of the plunger stroke and for various excitation currents.

In other words, on the valve according to the present invention, the axial component of the electromagnetic force as a function of the plunger stroke (FIG. 3) is substantially constant for a given excitation current in the electromagnet.

In any rest configuration, with a given preload on springs 13 and 14, bottom edge 28 of plunger 5 is located a given distance Ca from the bottom edge of opening 3 (FIG. 1). If electromagnet 6 is supplied with current such as to produce electromagnetic force Fi (FIG. 4), plunger 5 will move through stroke Ca. If the excitation current is such as to produce electromagnetic force Ff, plunger 5 will perform a further stroke Cu (this being the axial length of opening 3 as shown in FIG. 1) thus fully uncovering air supply opening 3. By varying the preload on springs 13 and 14, distance Ca between edge 28 of plunger 5 and edge 29 of opening 3 is also varied, thus resulting also in a variation of forces Fi and Ff corresponding to the initial and fully open positions of opening 3 (FIG. 4).

In other words, by appropriately varying the preload on springs 13 and 14, by means of a straightforward operation performable on the valve according to the present invention, this may be calibrated accurately enough for ensuring a given excitation current corresponds to a specific air supply passage on opening 3.

Unlike known valves of the aforementioned type, plunger 5 slides smoothly inside seat 2 by virtue of the surfaces of rings 22 and 23 permanently contacting the surface of seat 2, regardless of the stroke of plunger 5.

Moreover, the presence of radial holes 26, in conjunction with the annular chamber defined by the outer surface of center portion 21 of plunger 5 and by seat 2, prevents impurities depositing between the mating surfaces of plunger 5 and seat 2, by virtue of the cleansing action of the air through said annular chamber and said radial holes.

Finally, friction during axial displacement of plunger 5 is also reduced by the teflon coating on the lateral surface of the same.

To those skilled in the art it will be clear that changes may be made to the embodiment described and illustrated herein without, however, departing from the scope of the present invention.

We claim:

1. An electromagnetic air control valve for an internal combustion engine fuel supply device, said valve comprising a body (1) having a cylindrical sliding seat (2) and an opening (3) enabling the passage of air and coming out inside said seat (2); a plunger (5) sliding axially inside said seat, for regulating said air supply opening (3); and an electromagnet (6) having a core (10) designed to control displacement of said plunger (5) when said electromagnet is energized; said core having a rod (11) fitting through an axial hole (12) on said plunger; characterised by the fact that said plunger is connected elastically to said rod by means of two springs (13, 14), each designed to exert elastic force on said plunger in the opposite direction to that of the other spring; regulating means (17) being provided for enabling predetermined preloading of both said springs.

2. A valve as claimed in claim 1, characterised by the fact that said regulating means (17) consist of a threaded ring nut (17) resting on one end of one said spring (14) and screwed on to the threaded end of said rod (11).

3. A valve as claimed in claim 1, characterised by the fact that, inside said axial hole (12) on said plunger (5), there is formed an annular projection (15) projecting radially towards the hole axis; said two springs (13,14) being helical springs fitted through with said rod (11); one of said springs (13) being inserted between a shoulder (16) on said core (10) and said annular projection (15), and the other (14) between said projection (15) and said threaded ring nut (17).

4. A valve as claimed in claim 1, characterised by the fact that said plunger (5) comprises a tubular center portion (21) of magnetic material; and a pair of end rings (22, 23) of nonmagnetic material, having an outer surface designed to slide over the surface of said seat (2); said center portion (21) being defined by a lateral surface sized in such a manner as to prevent contact with said seat (2).

5. A valve as claimed in claim 1, characterised by the fact that said core (10) is defined towards said plunger (5) by a first conical outer surface (24); and by the fact that said axial hole (12) on said plunger (5) is defined at least partially by a second conical surface (25); the angles of said conical surfaces being such that, when said electromagnet is supplied with constant current, the axial component of the electromagnetic force exerted on said plunger (5) remains substantially constant alongside variations in the stroke of said plunger (5).

6. A valve as claimed in claim 5, characterised by the fact that said angles of said first (24) and second (25) conical surfaces are different.

7. A valve as claimed in claim 1, characterised by the fact that the lateral wall of said center portion (21) of said plunger (5) presents radial holes (26) enabling communication between said axial hole (12) on said plunger (5) and said seat (2); said holes (26) being formed in an annular portion close to the top end ring (22) of said pair.

8. A valve as claimed in claim 1, characterised by the fact that, between said threaded ring nut (17) and said spring (14) inserted between said ring nut (17) and said annular projection (15), there is provided a shoulder ring (20) having a conical surface.

9. A valve as claimed in claim 1, characterised by the fact that said axial hole (12) on said plunger (5) is defined, between said annular projection (15) and its bottom end, by a further conical surface (27).

10. A valve as claimed in claim 1, characterised by the fact that the axial length of said seat (2) is such as to enable the whole of said plunger (5) to remain inside said seat (2), at least throughout the stroke required for fully opening and closing said opening (3).

11. A valve as claimed in claim 1, characterised by the fact that said electromagnet (6) is housed inside a bell (31) having its bottom edge laser welded to said body (1).

12. A valve as claimed in claim 1, characterised by the fact that said core (10) presents an end pin (33) fitted inside a hole in the end wall of said bell (31), and secured to the same by permanently deforming the end of the pin itself.

13. A valve as claimed in claim 1, characterised by the fact that said electromagnet comprises a spool (36) of plastic material, from which project a pair of bars (35) each housing a blade (34) connected electrically to the winding of said electromagnet; each of said bars presenting small cavities (37) formed in lateral surfaces of the same.

14. A valve as claimed in claim 1, characterised by the fact that it comprises at least one bush (38) having an end wall (40) in which are formed openings for said bars (35); flexible tabs (41) projecting from said end wall (40) and having teeth designed to click elastically inside said cavity (37) for locking said bush (38) to the valve.

15. A valve as claimed in claim 1, characterised by the fact that, between said electromagnet and said end wall of said bell, there is inserted a precompressed sealing ring.

* * * * *